United States Patent Office 3,214,498
Patented Oct. 26, 1965

3,214,498
DISPERSANT COPOLYMERS FROM
POLYVINYLPYRROLIDINONE
La Verne N. Bauer, Cheltenham, Pa., assignor to Rohm &
Haas Company, Philadelphia, Pa., a corporation of
Delaware
No Drawing. Filed Apr. 17, 1961, Ser. No. 103,203
10 Claims. (Cl. 260—882)

This invention concerns a process for preparing oil-soluble polymers which have dispersant action and which contain mers or units from an N-vinyl-2-pyrrolidinone and mers from an ethylenically unsaturated polymerizable ester which supplies oil-solubilizing groups. This invention further deals with lubricating and fuel oil compositions containing these polymers.

Polymeric additives for lubricating oils are well known. These additives may be used to improve viscosity-temperature relations and/or depress pour points of oils. Recently, copolymers formed from N-vinyl-2-pyrrolidinone and alkyl acrylates or methacrylates have been used not only to improve viscosity index and to lower pour point but also to provide dispersant qualities in lubricating oils. Since the most costly portion or part of these copolymers is that derived from the N-vinyl-2-pyrrolidinone, it is economically desirable to use the smallest effective proportion thereof in the preparation of the copolymer and to utilize it in the most effective way.

It has now been discovered that oil-soluble polymers containing units from an N-vinyl-2-pyrrolidinone can be prepared in a form which provides more effective and improved dispersing action for a given proportion of such units or which provides a desired level of dispersing action from a smaller proportion, including proportions which are totally lacking in dispersing action as prepared by known methods from the same initial materials.

Polymers prepared according to the process of this invention, when dissolved in lubricants to improve the viscosity-temperature relations, may also depress the pour point and, at the same time, supply dispersing action, especially at relatively low temperatures. When dissolved in fuel oils, the polymers improve the stability of the resulting composition and prevent clogging of screens and filters. Since the polymers are ash-less dispersants, they do not promote formation of deposits, as may occur with alkaline earth metal salts under some conditions. They are especially effective dispersants at relatively low temperature levels such as are encountered in intermittent operation of combustion engines and can be used in conjunction with many kinds of additives such as antioxidants, stabilizers, wear-resistants, anti-corrosive agents, pour-point depressants, other viscosity index improvers, heavy-duty or high-temperature detergents, anti-foam agents, and other agents which may be used in compounding oils.

A method has now been discovered for preparing copolymers supplying good dispersant action at minimum contents of the nitrogenous component. This method comprises polymerizing under the influence of a free radical initiator and in the presence of a poly-N-vinyl-2-pyrrolidinone one or more polymerizable monoethylenically unsaturated esters, which ester or esters impart solubility of the final copolymer in oils.

A solution of a poly-N-vinyl-2-pyrrolidinone, such as a polymer of N-vinyl-2-pyrrolidinone itself or an alkyl substituted N-vinyl-2-pyrrolidinone such as 3-methyl-1-vinylpyrrolidinone, 4-methyl-1-vinylpyrrolidinone, 5-methyl-1-vinylpyrrolidinone, 3-ethyl-1-vinylpyrrolidinone, 3-butyl-1-vinylpyrrolidinone, 3,3-, 4,5-, or 5,5-dimethyl-1-vinylpyrrolidinone, 3,3,5-trimethyl-1-vinyl-pyrrolidinone, and other substituted N-vinyl-2-pyrrolidinones, preferably with not over ten carbon atoms, or copolymers of different N-vinyl-2-pyrrolidinones or copolymers of one or more of these in large proportion and another polymerizable monovinylidene compound (i.e., monomer having a $CH_2=C=$ group), is mixed with a polymerizable monoethylenically unsaturated ester, which is polymerized in contact with the poly-N-vinyl-2-pyrrolidinone under the influence of a free radical initiator. If desired, along with the polymerizable ester, there may be polymerized one or more other polymerizable monovinylidene compounds.

Polymers of the N-vinyl-2-pyrrolidinones are well known. They range in average molecular weights from about 5,000 to 2,000,000. Typical commercial polymers of N-vinyl-2-pyrrolidinone have viscosity or weight average molecular weights of about 25,000, 60,000, 500,000, and 1,500,000. These may be provided as light colored to white powders which are soluble in such organic solvents as isopropanol, butanol, amyl alcohols, octanol, methoxyethoxyethanol, butoxyethoxyethanol, or dimethylformamide, which may be termed inert with respect to the polymerizing components. The polymers of high molecular weights may also be used as concentrated aqueous solutions, which can be taken up with a water-miscible solvent, such as ethanol, isopropanol, butanol, isobutanol, methoxyethanol, ethoxyethanol, butoxyethanol, ethoxyethoxyethanol, dioxane, ethylene or propylene glycol, ethyl lactate, 2-butanone, tetrahydrofurane and mixtures of such solvents or such solvent with less readily water-miscible organic solvents. A poly-N-vinyl-2-pyrrolidinone may be dissolved in one of the above solvents or may be dissolved in a solvent therefor and the solution extended with an organic liquid which is relatively a non-solvent, such as benzene, toluene, or xylene, even though a very fine suspension of polymer is then formed. When it is desired that the final copolymer be used in an ester such as dioctyl sebacate, dinonyl azelate, triethyl phosphate, tributyl phosphate, or tricresyl phosphate, or a silicate ester, or in a silicone fluid, such liquid may be used to extend solution of the poly-N-vinyl-2-pyrrolidinone, if so desired, and polymerization of unsaturated ester performed in the resulting mixture.

In the place of a pure polyvinylpyrrolidinone, there may be used a copolymer of an N-vinyl-2-pyrrolidinone and another vinylidene monomer which contains sufficient units from an N-vinyl-2-pyrrolidinone to impart water solubility. In general, this requires more than about 35% of an N-vinyl-2-pyrrolidinone. Some useful copolymers have been described by Werntz in U.S. Patent No. 2,497,705, wherein there are described water-dispersible copolymers formed from N-vinyl-2-pyrrolidinone and vinyl laurate, lauryl acrylate, or lauryl methacrylate or the like, 5 to 30 moles of the former being copolymerized with one mole of the latter.

The proportion of a poly-N-vinyl-2-pyrrolidinone can be varied from about 0.5 part to about 20 parts for 99.5 parts to 80 parts of the polymerizable monomer or monomers to give final copolymers which are effective dispersants in oils.

Polymerizable monomers which may be used include esters of acrylic, methacrylic, itaconic, maleic, and fumaric acids and vinyl carboxylates or mixtures of esters, also mixtures of one or more esters with other polymerizable monoethylenically unsaturated monomers, which include styrenes, alkylstyrenes, vinyl ethers, vinylthioethers, and esters having substituted alcohol residues which may include amino groups or ether or other groups.

Perhaps the most important monomers comprise acrylic esters. There are readily available alkyl acrylates and methacrylates having alkyl groups from methyl to octadecyl and even larger, for groups of 20 to 24 carbon atoms may likewise be used. The average size of the alkyl group or groups is chosen to ensure solubility of the final copolymer at the desired concentration in the oil to be treated.

In general, the average size will be at least eight carbon atoms and for use of the final copolymer in some oils an average size of about 12 carbon atoms may be advisable. There may be used a single ester such as dodecyl acrylate or methacrylate or stearyl acrylate or methacrylate. More commonly mixed esters are used. The mixture may contain alkyl groups from octyl to myristyl or when the alkyl portion is derived from fractionated alcohols, lauryl to myristyl. A higher cut of alcohols provides a mixture of cetyl and stearyl groups. Other alkyl groups may also be used, starting with methyl and proceeding through ethyl, propyl, or isopropyl, butyl, 2-ethylbutyl, heptyl, octyl, 2,2,4-trimethylpentyl 2-ethylhexyl, nonyl, 2,4,4-trimethylhexyl decyl, or undecyl. Similarly, there may be used as comonomers acrylic esters containing a cycle in the alcohol portion of the ester, as in benzyl, butylbenzyl, cyclopentyl, cyclohexyl, dicyclopentyl, phenyl or alkylphenyl acrylates or methacrylates. As indicated above, the maximum proportion of such ester is limited to that which permits solubility of the final polymer in oils.

In place of acrylic esters or in conjunction with these esters there may be used comparable esters of itaconic acid. Thus, methyl, butyl, octyl, dodecyl, octadecyl, eicosyl, or tetracosyl and the like alkyl itaconates may be used or similar itaconates having a cycle in the alcohol portion, as shown above for acrylic esters. Furthermore, maleic or fumaric esters similarly constituted may be used. These last esters are best used in conjunction with acrylic esters or vinyl carboxylates.

The vinyl esters of saturated monocarboxylic acids may be used to provide the desired kind of final polymer. While vinyl esters may be of small molecular size such as vinyl acetate, vinyl propionate, or vinyl butyrate and then used in conjunction with esters of larger molecular size to ensure solubility of final polymer in oils, there may also be used such vinyl monomers as vinyl caprylate, vinyl laurate, or vinyl stearate. Vinyl acetate or propionate is particularly useful in conjunction with less readily polymerizable monomers such as itaconates, fumarates, and maleates.

Fumarates and itaconates may be used without addition of vinyl carboxylate, acrylic ester or styrene or other more readily polymerizable monomer. The alcohol portion can be any of those enumerated above with the average size of the alcohol portion being of sufficient size to ensure solubility in the oil in which the final polymer is to be used.

As shown above, various miscellaneous monovinylidene compounds noted above as styrene, alkylstyrene, vinyl ethers, and the like can be used in minor proportions in general to make up less than half of the final copolymer. The proportions in all cases will be such as to permit solubility of the final copolymer at the desired concentration in the oil to be used whether synthetic or of natural origin. Typical miscellaneous monomers include vinyl butyl ether, vinyl butyl thioether, octyl vinyl ether, dodecyl vinyl ether, tetradecyl vinyl thioether, phenyl vinyl ether, benzyl vinyl ether, cyclohexyl vinyl ether, comparable thioethers with cyclic groups, hydroxyethyl vinyl thioether, vinyl ketones, vinyl chloride, vinylidene chloride, also acrylamide, methacrylamide, N-methyl-, N-butyl-, N-octyl-, N-dodecyl-, N-phenyl-, N-cyclohexyl-, N-benzyl-, N,N-dimethyl-, N,N-dibutyl-, N-methyl-N-benzyl-, N-butoxymethyl-, or N-butoxyethyl-acrylamides or methacrylamides, and polymerizable esters, including acrylates, methacrylates, itaconates, maleates, and fumarates, having at least one heteroatom in the alcohol portion of the ester as in ethoxyethyl, butoxyethyl, octoxypropyl, butoxybutyl, phenoxyethyl, octylphenoxyethyl, cyclohexoxyethyl, benzoxyethyl, tetrahydrofurfuryl, tetrahydrofurfuryloxyethyl, methoxypolyethoxyethyl and other alkoxypolyethoxyethyl (with two to 40 ether groups), ethylthioethyl, butylthioethyl, ethylsulfinylethyl, 2-dimethylaminoethyl, 2-diethylaminopropyl, tert-butylaminoethyl, tert-octylaminoethyl, dimethylaminoethoxyethyl, dibutylphosphitoethyl, or diethylphosphonomethyl acrylates or methacrylates.

In the process of the invention, there are mixed poly-N-vinyl-2-pyrrolidinone and monomer or solvent and monomer and the mixture is heated to a temperature sufficient to bring about polymerization, usually between 50° and 150° C. Initiator may be present in the mixture before heating is started and/or may be added to the mixture as it is heated. Increments of initiator may be added as polymerization proceeds. Solvent may be used at the start of polymerization or it may be supplied as polymerization progresses but use of solvent is not entirely necessary as monomer acts as a solvent or diluent.

After polymerization has been carried to a good state of conversion, the polymer formed may be taken up in a solvent of a type conforming to the intended use, such as kerosene, if the final polymer is to be used in a fuel oil, such as mineral lubricating oil, if the final polymer is to find use in a lubricating oil, or such as an ester if the polymer is to be used in an ester lubricant such as dioctyl sebacate or azelate or a silicate ester or a phosphate ester. Transfer to a suitable liquid is effected by mixing polymer with or without solvent and such a liquid and heating the resulting mixture under reduced pressure to remove solvent and/or monomer. The mixture may be heated to 100°–150° C. at 2 to 20 mm. (Hg) pressure to accomplish the desired transfer with removal of volatile materials. In this way, convenient concentrated solutions of 25% to 50% of polymer are readily prepared in a desired type of liquid. If desired, however, the copolymer may be recovered as a residue.

Polymerization of monomer or monomers in the presence of a poly-N-vinyl-2-pyrrolidinone is effected under the influence of a free radical initiator. While the polymerization may be effected within the broad range between 50° and 150°, it is preferred to effect polymerization between about 60° and 125° C. The choice of temperature depends upon the particular initiator or initiator system which is selected. Polymerization may be started at one temperature and continued at another.

Useful initiators include both the peroxide and the azo-catalysts. Typical peroxides include benzoyl peroxide, acetyl peroxide, lauroyl peroxide, di-tert-butyl perbenzoate, di-tert-butyl perphthalate, tert-butyl perbenzoate, 2,2-bis(tert-butyl peroxy)butane, and methyl ethyl ketone peroxide. Typical azo initiators include azodiisobutyronitrile, azobis(dimethylvaleronitrile), azodiisobutylamide, azobis(α-ethylbutyronitrile), and azobis-(α,γ-dimethylcapronitrile).

Hydroperoxides provide a particularly interesting class of initiators. Typical of these are tert-butyl hydroperoxide, cumene hydroperoxide, diisopropylbenzene hydroperoxide, p-methane hydroperoxide pinane hydroperoxide, 2,5-dimethylhexane-2,5-dihydroperoxide and other tert-alkyl hydroperoxide and hydrocarbon-substituted benzene hydroperoxides. The hydroperoxides become effective in providing free radicals at somewhat lower temperatures than otherwise when there is supplied an activator. Particularly effective activators are quaternary ammonium compounds such as benzyltrimethylammonium chloride, dibenzyldimethylammonium bromide, butyldimethylammonium chloride, octyltrimethylammonium chloride, dodecyltrimethylammonium chloride, dodecyldimethylbenzylammonium chloride, dodecylbenzyldimethylbenzylammonium chloride, didodecenyldimethylammonium chloride, benzyldimethyldodecenylammonium chloride, octylphenoxyethyldimethylbenzylammonium chloride, diisobutylphenoxyethoxyethylimethylbenzylammonium chloride, cetylpyridinium chloride, N-octyl-N-methylmorpholinium chloride, and bis-quaternary salts such as those having quaternary nitrogens linked with an alkylene group or an alkylene group interrupted by either oxygen or an amide-containing group.

The amount of initiator or of initiators may be 0.01% to about 5% of the weight of the monomer or monomers. As has been stated above, the initiator may be added in increments over a period of time.

When an activator or a combination of activator and a promoter is used, the activator is proportioned to the amount of initiator. It is generally desirable to supply additional activator when the initiator is added in increments. The proportion of activator is usually about 5% to 40% of the weight of the initiator.

Additional details of the preparation of the polymers of this invention are presented in the following illustrative examples. Parts are by weight unless otherwise designated.

Example 1

A reaction vessel is fitted with a reflux condenser, stirrer, inlet tube or nitrogen gas, thermometer, and oil bath. It is charged with 8 parts of poly-N-vinyl-2-pyrrolidinone having a viscosity average molecular weight of about 60,000, and 20 parts of n-butyl alcohol. The vessel is flushed with nitrogen and the mixture is stirred until the polymer dissolves. There is then added 0.08 part of a 25% solution in butanol of tert-octylphenoxyethoxyethyldimethylbenzylammonium chloride. There is separately prepared a mixture of 93.3 parts of an alkyl methacrylate containing about 70% of dodecyl methacrylate and 30% of tetradecyl methacrylate, the purity of this alkyl methacrylate being 98.6%, 0.4 part of diisopropylbenzene hydroperoxide solution containing 50% of this hydroperoxide in an alcohol-ketone mixture, and 5 parts of toluene. After solution of the polyvinylpyrolidinone is complete, there is added to the reaction vessel 27.5 parts of the alkyl methacrylate mixture. The reaction vessel is then heated by means of the oil bath. Polymerization begins when the batch temperature reaches about 105° C., the time then being taken from this point forward. Twenty minutes after the initial reaction, addition of the alkyl methacrylate mixture is started incrementally. The entire alkyl methacrylate mixture is added over the course of 100 minutes with the batch maintained at 107°–110° C. Over the next five hours, additions are made of diisopropylbenzene hydroperoxide solution, of the quaternary ammonium chloride solution, and of toluene, the total amounts added being 0.48 part of the hydroperoxide, 0.048 part of the quaternary ammonium chloride, and 25 parts of toluene. At the end of this time the reaction mixture is analyzed for polymer by removal of volatile material from a sample. The reaction mixture contains 58.6% of polymer. When the polymer is dissolved in toluene to give a 30% solution, it has a viscosity of 219 centistokes at 100° F.

A portion of the reaction mixture amounting to 114.9 parts is mixed with 92.7 parts of a 100 viscosity neutral oil. This mixture is heated under reduced pressure with removal of volatile materials. The final product obtained after 90 minutes at 105° C./10 mm. is a solution containing 39.5% of polymer in oil.

This product is examined for dispersing action by the standard test for dispersing asphaltenes in oil and it is found that 0.25% of the copolymer effectively disperses 0.4% of asphaltenes.

Dispersing activity can be evaluated by the action of a given copolymer on asphaltenes. These may be described as the pentane-insoluble, chloroform-soluble oxidation products of asphaltic lubricating oils, such as Capella D refrigerator oil, containing 0.005% of an iron soap as catalyst. The oxidation products are precipitated with pentane, separated, and dissolved in chloroform in a standard concentration (20 mg./ml.). Oil solutions are prepared and treated with a range of concentrations of dispersant. The samples are then heated in an oven, as at 150° C. or 90° C., and cooled. From the appearance of the test samples there is determined the relative dispersion activity of the agent. Lack of dispersing activity is shown by flocculation, while suspension indicates dispersing action. From the minimum concentration of agent needed to cause suspension of a fixed weight of asphaltenes, comparative dispersing activities can be determined.

A copolymer prepared under similar conditions, but starting with monomeric N-vinyl-2-pyrrolidinone in place of the above poly-N-vinyl-2-pyrrolidinone gives a copolymer which is less effective in dispersing action, 0.5% of this copolymer being required to disperse 0.4% of asphaltenes in the dispersancy test at 150° C.

Example 2

The method of Example 1 is applied to a starting mixture of 8 parts of poly-N-vinyl-2-pyrrolidinone of a viscosity average molecular weight of 65,000 and 20 parts of n-butyl alcohol and a mixture composed of 30 parts of cetyl-stearyl methacrylate of 100% purity, 50.7 parts of lauryl-myristyl methacrylate of 98.6% purity, 12.6 parts of butyl methacrylate of 94.9% purity, 0.4 part of a 50% solution of diisopropylbenzene hydroperoxide in a mixture of alcohol and ketone, and 5 parts of toluene. After the poly-N-vinyl-2-pyrrolidinone is dissolved in the butanol, addition is made of 29.5 parts of the methacrylic mixture along with 0.08 part of a 25% solution of diisobutylcresoxyethoxyethyldimethylbenzylammonium chloride in butanol. After the polymerization reaction has been initiated by heating the reaction vessel, the rest of the methacrylic mixture is added in increments over 100 minutes with the batch temperature maintained at 110°–113° C. After two hours and forty minutes with the temperature still at 113° C., there is added 0.08 part of the 50% diisopropylbenzene hydroperoxide solution, 0.016 part of the 25% solution of quaternary ammonium chloride, and 5 parts of toluene. At 4 hours, 4 hours and 40 minutes, 5 hours and 20 minutes and 6 hours additions are made of 0.12 part of the hydroperoxide solution, 0.024 part of the quaternary ammonium chloride solution, and 5 parts of toluene. During these additions the temperature is held at about 103–105° C. At 6 hours 30 minutes, 50 parts of toluene are added and heating is discontinued. The resulting reaction product is a solution containing 43.6% of copolymer in solvent. A 30% solution of the copolymer in toluene has a viscosity of 176 cs. at 100° F.

The copolymer is transferred to oil by mixing 164.3 parts of copolymer solution with 102.5 parts of 100 viscosity neutral oil and heating this mixture under reduced pressure to 105° C./10 mm. to yield a 38.8% solution of copolymer in oil. In the standard asphaltenes test it is found that 0.25% of this copolymer readily disperses 0.4% of asphaltenes.

Example 3

A reaction vessel equipped as above is charged with 4 parts of poly-N-vinyl-2-pyrrolidinone of a molecular weight of about 25,000 (viscosity average) and 10 parts of n-butyl alcohol. There is separately prepared a mixture of 83.9 parts of lauryl-myristyl methacrylate of 99% purity, 0.4 part of a 50% solution of diisopropylbenzene hydroperoxide in alcohol and ketone, and 5 parts of toluene. There is also prepared a mixture of 6 parts of pure laurylmyristyl methacrylate, 4 parts of N-vinyl-2-pyrrolidinone, 0.1 part of a 50% solution of diisopropylbenzene hydroperoxide and 0.02 part of a 25% solution of tert-octylphenoxyethoxyethyldimethylbenzylammonium chloride in butanol. As above, the reaction vessel is blanketed with nitrogen and the mixture of poly-N-vinyl-2-pyrrolidinone and butyl alcohol is stirred until solution results. There is then added 89.3 parts of the first lauryl-myristyl methacrylate mixture and 0.08 part of a 25% solution of the above-noted quaternary ammonium salt in butanol. The resulting mixture is stirred and heated, initial time being taken when the mixture reaches a temperature of 105° C. Thereafter, the first lauryl-myristyl methacrylate mixture is added in portions of 6.3 parts at 10 minute intervals with the temperature rising to 110° C. Thereafter, the second mixture above is charged at the rate of 3.3 parts at 5 minutes intervals. Additions are made of hydroperoxide quaternary ammonium salt and toluene beginning at 3 hours and continuing to 6 hours, the total amount of hydroperoxide being 0.48 part, and the total of quaternary ammonium chloride being 0.048 part. The total of toluene added in increments is 25 parts, but at the end of six and one-half hours, the reaction mixture is diluted with an additional 100 parts of toluene. The resulting product is a 35.7% solution of copolymer which in a toluene solution containing 30% of copolymer has a viscosity of 95 cs. at 100° F. In the standard dispersancy test it is found that 0.125% of this copolymer disperses 0.4% of asphaltenes.

A comparable copolymer made from a mixture consisting entirely of monomers requires 0.5% of copolymer for dispersing 0.4% of asphaltenes.

Example 4

The procedure of Example 1 is followed with a solution of 4 parts of poly-N-vinyl-2-pyrrolidinone of a viscosity average molecular weight of 30,000 in 10 parts of n-butyl alcohol to which is added 96 parts of lauryl-myristyl methacrylate along with the same proportions of diisopropylbenzene hydroperoxide and 0.48 part of the same quaternary ammonium compound. The copolymer is transferred from the toluene solution to a 100 viscosity neutral oil in the same way to give a solution containing 39.4% of copolymer in oil. In the standard asphaltenes test, 0.25% of this copolymer disperses 0.4% asphaltenes in oil.

The same procedure is applied to a copolymer based on 2 parts of poly-N-vinyl-2-pyrrolidinone and 98 parts of lauryl-myristyl methacrylate. This copolymer is again transferred to 100 viscosity neutral oil. In the standard asphaltenes test 0.5% of this copolymer readily disperses 0.4% of asphaltenes in oil. The same procedure is applied to the formation of the copolymer from 0.5 part of poly-N-vinyl-2-pyrrolidinone and 99.5 parts of lauryl-myristyl methacrylate. In the standard asphaltenes test it is found that 1% of this copolymer disperses 0.4% of asphaltenes in oil. This degree of dispersing activity is unusual because copolymers formed from mixtures of monomers in proportions of 98:2 to 99.5:0.5 exhibit no dispersing action whatsoever. It is also interesting to note that when monomeric N-vinyl-2-pyrrolidinone is added to a partially polymerized mixture of alkyl methacrylates, the resulting copolymer fails to exhibit dispersing action when less than 2 parts of N-vinyl-2-pyrrolidinone are used in preparing the final copolymer. When the above procedure is applied to the preparation of a copolymer from 20 parts of poly-N-vinyl-2-pyrrolidinone and 80 parts of lauryl-myristyl methacrylate, the final copolymer which is obtained is likewise an effective dispersant, 0.5% of copolymer readily dispersing 0.4% of asphaltenes in oil.

Example 5

The procedure of Example 1 is followed starting with eight parts of poly-N-vinyl-2-pyrrolidinone of a weight average molecular weight of 62,000 and 92 parts of lauryl-myristyl methacrylate. The initial product is 56.5% solution of copolymer in toluene and butanol.

A portion of this copolymer solution is mixed with dioctylsebacate and the volatile materials are removed by heating the mixture to 110° C./10 mm. to give a 30% solution of copolymer in ester. This solution has a viscosity of 509 cs. at 210° F.

Another portion of the above copolymer solution is mixed with tributyl phosphate, and the solution containing 30% of the copolymer in this ester is prepared. This solution has a viscosity of 200 cs. at 210° F.

These solutions in ester are particularly suitable for modifying the properties of similar esters, for which purpose only 0.5 to 2% of copolymer is ordinarily required, although both smaller and larger proportions of copolymer may be incorporated in ester lubricants.

Example 6

The procedure of Example 2 is followed with substitution of white mineral oil for toluene. The final copolymer is adjusted with 150 viscosity neutral oil to give a copolymer content of 43%. In the standard asphaltenes test 0.5% of this copolymer readily disperses 0.4% of asphaltenes in oil.

This procedure is again followed with substitution of mineral oil for toluene and substitution of hexanol for buantol. The final copolymer solution is adjusted with 150 viscosity neutral oil to a copolymer content of 44%. This copolymer is effective in the standard asphaltenes test, 0.5% of copolymer dispersing 0.4% of asphaltenes in oil.

Example 7

The procedure of Example 1 is followed, but in place of the poly-N-vinyl-2-pyrrolidinone there is used a copolymer prepared from 4 parts of lauryl-myristyl acrylate and 8 parts of N-vinyl-2-pyrrolidinone, 12 parts of this copolymer being used in 28 parts of n-butanol. The solution of this copolymer in butanol is treated with 88 parts of lauryl-myristyl methacrylate, the same proportions of diisopropylbenzene hydroperoxide and of the quaternary ammonium salt are used and also the same proportions of toluene. In the standard dispersancy test 0.25% of this copolymer readily disperses 0.4% of asphaltenes in oil.

Example 8

In the same way, a solution of 8 parts of poly-N-vinyl-2-pyrrolidinone in 20 parts of n-butyl alcohol is reacted with a mixture of 73.6 parts of vinyl stearate and 18.4 parts of vinyl acetate in toluene. The reaction time, however, is increased to a total of 24 hours and the total amount of diisopropylbenzene hydroperoxide is increased to 2 parts, the total amount of quaternary ammonium salt being increased to 0.48 part. This copolymer in the standard dispersancy test is effective at 0.5% for 0.4% of asphaltenes in oil at 150° C.

Example 9

The procedure of Example 7 is followed with a solution of 8 parts of poly-N-vinyl-2-pyrrolidinone in 20 parts of n-butyl alcohol which is copolymerized with a mixture of 73.6 parts of di(lauryl-myristyl) fumarate, and 18.4 parts of vinyl acetate. As in Example 7, the total reaction time is 24 hours with use of 2.5 parts of diisopropylbenzene hydroperoxide and 0.6 part of the quaternary ammonium salt. In the standard asphaltenes test 0.5% of this copolymer disperses 0.4% of asphaltenes in oil at 150° C.

The copolymer of N-vinyl-2-pyrrolidinone and lauryl-myristyl acrylate used as a starting material of Example 7 has a molecular weight of 50,000 (viscosity average). The starting poly-N-vinyl-2-pyrrolidinone of Examples 8 and 9 has a molecular weight of 30,000 (viscosity average).

Example 10

Apparatus described in Example 1 is charged with two parts of poly-N-vinyl-2-pyrrolidinone of a molecular weight of 1,500,000 (viscosity average) and 10 parts of butanol. Nitrogen is flowed through the apparatus. The mixture is stirred until homogeneous. There is separately prepared a mixture of 48 parts of dodecyl methacrylate, 2.5 parts of toluene, and 0.2 part of diisopropylbenzene hydroperoxide. A portion of 15.2 parts of this mixture is added to the apparatus and the resulting mixture is heated to about 100° C. with stirring. There is added a solution of 0.01 part of diisobutylcresoxyethoxyethyl benzyl dimethyl ammonium chloride hydrate in butanol. After 20 minutes additions of the rest of the dodecyl methacrylate mixture are begun and continued over an hour and 40 minutes while heating and stirring are continued. At 2⅔ hours additions are made of 0.04 part of a 50% solution of diisopropylbenzene hydroperoxide in alcohol and acetone, of 0.008 part of a 25% solution of the above noted quarternary ammonium salt in butanol, and of 2.5 parts of toluene. At 4, 4⅔, 5⅓, and 6 hours additions are made of 0.06 part of the same hydroperoxide solution, 0.012 part of the same quaternary ammonium salt solution, and 2.5 parts of toluene. Heating at 100° C. is discontinued at 7 hours. The product is a 40.9% solution of copolymer in toluene. A portion adjusted to 30% of copolymer in toluene has a viscosity of 437.2 centistokes at 100° F.

The copolymer is transferred to a 100 neutral oil by heating 95.3 parts of the 40.9% solution of copolymer in toluene with 76 parts of the oil to 106° C. at 10 mm. (Hg) pressure. The product is a 32% solution of copolymer in oil having a viscosity of 685 cs. at 210° F.

A one percent solution of this copolymer was made in a 100 neutral oil and was tested for dispersancy. It dispersed 0.2% of asphaltenes at 90° C.

Solutions of this copolymer were made to contain one and two percent of copolymer respectively in a typical 100 neutral oil having a pour point of 0° F. and a viscosity index of 94. The one percent solution has viscosities at 100° F. of 27.95 cs. and at 210° F. of 5.45 cs. corresponding to a viscosity index of 140. The two percent solution has viscosities at 100° F. of 36.79 cs. and at 210° F. of 7.24 cs. corresponding to a viscosity index of 150. Both solutions have pour points below −40° F.

The above procedure is repeated but with substitution of an equal weight of a poly-N-vinyl-2-pyrrolidinone of a molecular weight of about 600,000. The final copolymer is similar to that shown above except that 0.125% of the copolymer in oil disperses 0.2% of asphaltenes at 90° C.

*Example 11*

There are mixed in 48 parts of a commercial lauryl-myristyl methacrylate 2.5 parts of toluene, and one part of a 50% solution of diisopropylbenzene hydroperoxide in alcohol. A portion of 15.5 parts of this mixture, 2 parts of poly-N-vinyl-2-pyrrolidinone of a molecular weight of about 24,000 (viscosity average), and 0.2 part of a 25% solution of diisobutylphenoxyethoxyethyl benzyl dimethyl ammonium chloride monohydrate in butanol are placed in an apparatus like that used in Example 1. The apparatus is flushed with nitrogen and the charge is heated to 110° C. After 20 minutes the rest of above mixture is run into the heated reaction mixture over a period of one hour and 40 minutes. Additions are made from time to time of the hydroperoxide and quaternary ammonium salt solutions, and toluene for totals of 1.4, 0.28, and 12.5 parts respectively. After four hours the temperature of the reaction mixture is reduced to 105° C. where it is maintained for another 2⅔ hours. The product is a 41.8% solution of copolymer in solvent. A portion reduced with toluene to a copolymer content of 30% has a viscosity at 100° F. of 48.6 cs.

A mixture of 88.8 parts of the above product and 74.1 parts of light lubricating oil is heated at 105° C./10 mm. for one hour to give 118.8 parts of a 31.3% solution of the copolymer in oil, this solution having a viscosity of 128 cs. at 210° F.

A solution of 0.5% of this copolymer in a typical lubricating oil disperses 0.4% of asphaltenes at 150° C. In another test oil 0.25% of the copolymer disperses 0.2% of asphaltenes at 90° C.

Solutions of this copolymer were made in an oil having a viscosity index of 94 and a pour point of 0° F. by the A.S.T.M. method. The solution containing one percent of copolymer has viscosities of 4.79 cs. at 210° F. and 24.90 cs. at 100° F. giving a viscosity index of 128. This solution has a pour point below −50° F. The two percent solution has viscosities of 5.70 cs. at 210° F. and 29.22 cs. at 100° F. giving a viscosity index of 143. The pour point of the two percent solution is likewise below −50° F.

*Example 12*

A reaction vessel equipped as above is charged with 8 parts of poly-N-vinyl-2-pyrrolidinone of a molecular weight of about 15,000, 10 parts of butanol, and 10 parts of dioxane which are stirred together. A mixture is prepared from 87 parts of a lauryl methacrylate containing minor proportions of octyl, decyl, and myristyl methacrylates, 5 parts of 2-methyl-5-vinylpyridine, 5 parts of toluene, and 0.4 part of a 50% solution of tert-butyl hydroperoxide in alcohol. A portion of 29.2 parts of the latter mixture and 0.02 part of dodecylbenzyldimethylammonium chloride in butanol are supplied to the reaction vessel containing the first mixture and having been flushed with nitrogen and heated to 105° C. The rest of the latter mixture is added in increments over two hours. Shortly thereafter 0.08 part of a 25% solution of the hydroperoxide, 0.016 part of a 25% solution of the above quaternary salt, and 5 parts of toluene are added. At 4, 4⅔, 5⅓, and 6 hours additions are made of 0.12 part of the 50% hydroperoxide solution, 0.024 part of the quaternary solution, and 5 parts of toluene. After six hours and 45 minutes the heating at 105° C. is discontinued. The product is a 42.4% solution of copolymer in solvents. A sample reduced with toluene to a 30% copolymer content has a viscosity of 123.2 cs. at 100° F.

A mixture of 97.1 parts of this copolymer solution and 81.5 parts of light lubricating mineral oil is heated to 105°/10 mm. for two hours to give 130.5 parts of a 31.6% solution of copolymer in oil. This solution has a viscosity at 210° F. of 470 cs.

In dispersancy tests 0.5% of this copolymer in oil disperses 0.4% of asphaltenes at 150° C., while 0.06% disperses 0.2% of asphaltenes at 90° C.

A 1% solution of this copolymer in a neutral oil having viscosities of 4.05 cs. at 210° F. and of 21.27 cs. at 100° F. for a viscosity index of 96 and having a 0° F. pour test (A.S.T.M. method) gives viscosities of 5.33 cs. at 210° F. and 27.22 cs. at 100° F. with a viscosity index of 141. The pour point is −35° F.

A 2% solution of this copolymer in the same lubricating oil gives viscosities of 6.96 cs. at 210° F. and 34.65 cs. at 100° F. with a viscosity index of 153. The pour point of this blend is −40° F.

The above procedure is followed with substitution of five parts of dimethylaminoethyl methacrylate for the 2-methyl-5-vinylpyridine. The product is a solution of copolymer which at 30% in toluene gives a viscosity of 159 cs. at 100° F. In dispersancy tests 0.5% of this copolymer in oil disperses 0.4% of asphaltenes at 150° C.

*Example 13*

The procedure of Example 10 is followed with 5 parts of poly-N-vinyl-2-pyrrolidinone of a molecular weight of about 25,000 and 12.5 parts of butanol being supplied to the reaction vessel and stirred until homogeneous. A separate mixture is prepared of 85 parts of lauryl-myristyl methacrylate, 21.3 parts of a 48% solution of lauryloxypolyethoxyethyl methacrylate (having about 30 ether groups) in benzene, and 0.4 part of diisopropylbenzene hydroperoxide in 50% solution in alcohol and acetone. The reaction vessel is flushed with nitrogen and heated until the contents reach 105° C. Addition is made of 0.08 part of a 25% octylphenoxyethoxyethylbenzyldimethylammonium chloride solution in butanol. The separate mixture of esters is then added in increments over a two-hour period. At intervals over the next four hours additions are made of the 50% solution of the hydroperoxide, of the 25% solution of quaternary ammonium salt, and toluene for totals of 0.56 part, 0.102 part, and 25 parts respectively. Heating is continued for almost 7 hours. The product is a 41.5% solution of copolymer. When it is adjusted with toluene to a 30% copolymer content, the solution then has a viscosity of 207.7 cs. at 100° F.

Copolymer is transferred to oil by mixing 104.3 parts of the 41.5% copolymer solution with 90.3 parts of light lubricating petroleum oil and heating to 105° C./10 mm. over two hours to give a 30.4% solution of copolymer in oil. It has a viscosity of 1226 cs. at 210° F.

A solution of 0.125% of this copolymer in oil disperses 0.4% of asphaltenes at 150° C., while a 0.25% solution disperses 0.2% of asphaltenes at 90° C.

A one percent solution of this copolymer in the same oil as used in Example 12 (96 V.I.) has viscosities of 5.74 cs. at 210° F. The pour point is −35° F.

A two percent solution in the same oil has viscosities of 8.18 cs. at 210° F. and 38.15 cs. at 100° F. The pour point is −40° F. The one percent solution has a viscosity index of 155 while the two percent solution has a viscosity index of 159.

*Example 14*

The above procedure is repeated starting with 8 parts of poly-N-vinyl-2-pyrrolidinone and 20 parts of butanol and gradually adding a mixture of 73.6 parts of lauryl-myristyl methacrylate, 18.4 parts of styrene, 5 parts of toluene, and 0.4 part of a 50% solution of diisopropylbenzene hydroperoxide. As usual, the vessel is flushed with nitrogen. It is heated at 105° C. The first addition of 29.1 parts of the latter mixture is followed by addition of 0.08 part of a 25% solution of diisobutylphenoxyethoxyethylbenzyldimethyl ammonium chloride hydrate in butanol. As copolymerization progresses, five additions of the hydroperoxide, quaternary ammonium salt, and toluene are made for totals of 0.56, 0.102, and 25 parts respectively. After 7 hours, heating is discontinued. The product is a 39.1% solution of copolymer, which, when reduced to 30% with toluene, gives a viscosity at 100° F. of 203.9 cs.

A mixture of 191.5 parts of the 39.1% copolymer solution and 128 parts of light oil are mixed and heated to 105° C./10 mm. to give 219.7 parts of a 34.2% solution of copolymer in oil. It has a viscosity of 1820 cs. at 210° F.

A solution of 0.125% of this copolymer in oil disperses 0.4% of asphaltenes at 150° C.

A one percent solution of this copolymer in the 94 V.I. lubricating oil has viscosities of 5.44 cs. at 210° F. and 27.82 cs. at 100° F. with a viscosity index of 142. A two percent solution has viscosities of 7.46 cs. at 210° F. and 37.09 cs. at 100° F. with a viscosity index of 152.

*Example 15*

The reaction vessel is first charged with 8 parts of poly-N-vinyl-2-pyrrolidinone of molecular weight of about 20,000 and 20 parts of n-hexanol which are stirred to a homogeneous solution. A mixture is made of 72 parts of lauryl-myristyl methacrylate, 20 parts of ethyl acrylate, 5 parts of methyl ethyl ketone, and 0.3 part of 70% solution of cumene hydroperoxide. While the reaction vessel is swept with nitrogen and heated to 106° C., 29.1 parts of the mixture are added together with 0.08 part of a 25% solution of di-dodecenyl)dimethylammonium chloride in alcohols. After 20 minutes the rest of the mixture is gradually added followed by addition of 0.06 part of the cumene hydroperoxide solution and 0.016 part of the quaternary ammonium salt solution. At 4, 4¾, 5⅓, and 6 hours additions are made of 0.09 part of the hydroperoxide solution, of 0.024 part of the quaternary ammonium salt solution, and 5 parts of toluene. Temperatures are held at 105–106° C. for 6.5 hours. The product is a 44.0% solution of copolymer, which, after adjustment to 30% with toluene has a viscosity of 106 cs. at 100° F.

A mixture of 182.3 parts of the product and 118.5 parts of lubricating oil is heated at 105° C./10 mm. for four hours, to give 210.6 parts of a 39% solution of copolymer in oil. This solution has a viscosity at 210° F. of 252 cs.

A solution of 0.25% of this copolymer in oil disperses 0.4% of asphaltenes at 150° C.

A one percent solution of this copolymer in the 94 V.I. oil has viscosities of 4.97 cs. at 210° F. and 25.28 cs. at 100° F. with a viscosity index of 137. The pour point is reduced from 0° F. to −50° F.

A two percent solution has viscosities of 6.21 cs. at 210° F. and 30.94 cs. at 100° F. with a viscosity index of 150. The pour point is below −55° F.

I claim:

1. A process for preparing oil-soluble copolymers which comprises solution polymerizing under the influence of a free radical polymerization initiator selected from the class consisting of peroxidic and azo polymerization catalysts a mixture of a solution of a poly-N-vinyl-2-pyrrolidinone in an organic solvent therefor and at least one polymerizable monoethylenically unsaturated ester having a hydrocarbon group imparting oil-solubility to the resulting copolymer and having an average size of at least 8 carbon atoms, the poly-N-vinyl-2-pyrrolidinone comprising about 0.5% to about 20% of the combined weight of the said ester and of the said poly-N-vinyl-2-pyrrolidinone.

2. The process of claim 1 in which the organic solvent for said poly-N-vinyl-2-pyrrolidinone is water-miscible.

3. A process for preparing oil-soluble copolymers which comprises solution polymerizing under the influence of a free radical polymerization initator selected from the class consisting of peroxidic and azo polymerization catalysts; a mixture of a solution of a poly-N-vinyl-2-pyrrolidinone in an organic solvent therefor and at least one acrylic ester of an alkanol having an alkyl group of at least eight carbon atoms imparting oil-solubility to the resulting copolymer, the poly-N-vinyl-2-pyrrolidinone comprising about 0.5% to about 20% of the combined weight of the acrylic ester and of the said poly-N-vinyl-2-pyrrolidinone.

4. The process of claim 3 in which the initiator is an organic hydroperoxide and a quaternary ammonium salt.

5. A process for preparing oil-soluble copolymers which comprises solution polymerizing under the influence of a free radical polymerization initiator selected from the class consisting of peroxidic and azo polymerization catalysts; a mixture of a solution of a poly-N-vinyl-2-pyrrolidinone in a water-miscible organic solvent and at least one alkyl methacrylate having an alkyl group of at least eight carbon atoms imparting oil-solubility to the resulting copolymer, the poly-N-vinyl - 2 - pyrrolidinone comprising about 0.5% to about 20% of the combined weights of the alkyl methacrylate and of the poly-N-vinyl-2-pyrrolidinone.

6. A process for preparing oil-soluble copolymers which comprises solution polymerizing under the influence of a free radical polymerization inditator selected from the class consisting of peroxidic and azo polymerization catalysts; a mixture of a solution of poly-N-vinyl-2-pyrrolidinone in a water-miscible organic solvent, at least one alkyl methacrylate having an alkyl group of at least eight carbon atoms imparting oil-solubility to the final copolymer, and at least one other polymerizable monoethylenically unsaturated monomer, the poly-N-vinyl-2-pyrrolidinone comprising about 0.5% to about 20% of the combined weight of the poly-N-vinyl-2-pyrrolidinone, the alkyl methacrylate and said other unsaturated monomer.

7. A process for preparing oil-soluble copolymers which comprises solution polymerizing under the influence of a free radical polymerization initiator selected from the class consisting of peroxidic and azo polymerization catalysts; a mixture of a solution of poly-N-vinyl-2-pyrrolidinone in a water-miscible organic solvent and of a plurality of alkyl methacrylates, the average carbon atom content of the alkyl groups being at least about 12, the poly-N-vinyl-2-pyrrolidinone comprising about 0.5% to about 20% of the combined weight of the alkyl methacrylates and of the poly-N-vinyl-2-pyrrolidinone.

8. The process of claim 7 in which the mixture of alkyl methacrylates contains lauryl methacrylates, stearyl methacrylate, and an alkyl methacrylate with one to four carbon atoms in the said alkyl group.

9. The process of claim 8 in which there is used as initiator an organic hydroperoxide and a quanternary ammonium salt.

10. The process of claim 9 in which the hydroperoxide is diisopropylbenzene hydroperoxide.

References Cited by the Examiner

UNITED STATES PATENTS

| | | | |
|---|---|---|---|
| 2,890,199 | 6/59 | McNulty et al. | 260—92.8 |
| 2,949,435 | 8/60 | Davis et al. | 260—29.6 |
| 2,958,673 | 11/60 | Jen | 260—885 |
| 3,067,163 | 12/62 | Bauer | 252—51.5 |

FOREIGN PATENTS

| | | |
|---|---|---|
| 198,516 | 7/58 | Austria. |
| 560,549 | 7/58 | Canada. |

OTHER REFERENCES

Henglein et al. Proc. U.N. Intern. Conf. Peaceful Uses Atomic Energy, 2nd Geneva, 1958, vol. 29, pages 206–16.

MURRAY TILLMAN, *Primary Examiner.*

WILLIAM H. SHORT, JAMES A. SEIDLECK,
*Examiners.*